United States Patent
Bolstad et al.

(10) Patent No.: US 8,958,470 B2
(45) Date of Patent: Feb. 17, 2015

(54) METHOD AND APPARATUS FOR SPARSE POLYNOMIAL EQUALIZATION OF RF RECEIVER CHAINS

(71) Applicants: Andrew Bolstad, Arlington, MA (US); Benjamin A. Miller, Cambridge, MA (US); Karen Gettings, Carlisle, MA (US); Merlin Green, Salem, MA (US); Helen Kim, Sudbury, MA (US); Joel Goodman, Alexandria, VA (US)

(72) Inventors: Andrew Bolstad, Arlington, MA (US); Benjamin A. Miller, Cambridge, MA (US); Karen Gettings, Carlisle, MA (US); Merlin Green, Salem, MA (US); Helen Kim, Sudbury, MA (US); Joel Goodman, Alexandria, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 108 days.

(21) Appl. No.: 13/626,913

(22) Filed: Sep. 26, 2012

(65) Prior Publication Data
US 2014/0029660 A1 Jan. 30, 2014

Related U.S. Application Data

(60) Provisional application No. 61/675,956, filed on Jul. 26, 2012.

(51) Int. Cl.
*H03H 7/40* (2006.01)

(52) U.S. Cl.
USPC .......................................... 375/232; 375/350

(58) Field of Classification Search
CPC . H04L 25/03006; H04L 1/0045; H04L 27/01; H04L 25/025; H03H 21/0012; H03H 17/06; H03H 17/0294; H03H 2017/0072; H03H 17/0248; H03H 21/0016; H03H 17/0229; H03H 17/0283; H03H 2021/0092; H03H 2021/0094

USPC .......... 375/229, 230, 232, 340, 350; 708/300, 708/301, 305, 322, 323

See application file for complete search history.

(56) References Cited

U.S. PATENT DOCUMENTS

| | | | |
|---|---|---|---|
| 5,594,612 | A | 1/1997 | Henrion |
| 5,768,168 | A | 6/1998 | Im |
| 5,852,630 | A | 12/1998 | Langberg et al. |
| 6,360,191 | B1 | 3/2002 | Koza et al. |
| 6,570,514 | B1 | 5/2003 | Valezquez |
| 7,129,874 | B2 | 10/2006 | Bjornsen |
| 7,215,717 | B2 | 5/2007 | Doi |
| 7,460,613 | B2 | 12/2008 | Sahlman |
| 7,577,211 | B2 | 8/2009 | Braithwaite |
| 7,808,315 | B2 | 10/2010 | Goodman et al. |
| 8,301,104 | B1 | 10/2012 | Gupta et al. |

(Continued)

OTHER PUBLICATIONS

Balankutty, et al.; "An Ultra-Low Voltage, Low-Noise, High Linearity 900-MHz Receiver With Digitally Calibrated In-Band Feed-Forward Interferer Cancellation in 65-nm CMOS;" IEEE Journal of Solid-State Circuits; vol. 46, No. 10; Oct. 2011; pp. 2268-2283.

(Continued)

*Primary Examiner* — Dac Ha
(74) *Attorney, Agent, or Firm* — Daly, Crowley, Mofford & Durkee, LLP (57) ABSTRACT

A radio frequency (RF) receiver includes an analog receiver chain followed by digital circuitry for reducing nonlinear distortion components within an output signal of the analog receiver chain. In at least one embodiment, the digital circuitry includes a digital equalizer that is configured with a sparse set of Volterra series coefficients. In this manner, a desired level of linearity performance may be achieved in the receiver with relatively low power consumption.

29 Claims, 4 Drawing Sheets

(56) References Cited

U.S. PATENT DOCUMENTS

| | | | |
|---|---|---|---|
| 8,410,960 | B2 | 4/2013 | Hekstra et al. |
| 2003/0016741 | A1* | 1/2003 | Sasson et al. ............... 375/229 |
| 2004/0148578 | A1 | 7/2004 | McConaghy et al. |
| 2004/0172609 | A1 | 9/2004 | Hassibi et al. |
| 2005/0219089 | A1 | 10/2005 | Batruni |
| 2006/0133470 | A1* | 6/2006 | Raz et al. ............... 375/232 |
| 2006/0273942 | A1 | 12/2006 | Koste et al. |
| 2008/0130787 | A1 | 6/2008 | Copeland |
| 2008/0134109 | A1 | 6/2008 | Hammouda et al. |
| 2008/0187035 | A1* | 8/2008 | Nakamura et al. ............ 375/232 |
| 2008/0258949 | A1 | 10/2008 | Galton et al. |
| 2008/0270062 | A1 | 10/2008 | Laraia et al. |
| 2009/0033526 | A1 | 2/2009 | Rofougaran |
| 2010/0031206 | A1 | 2/2010 | Wu et al. |
| 2010/0249623 | A1* | 9/2010 | Makdissi ............... 600/509 |
| 2010/0306722 | A1 | 12/2010 | LeHoty et al. |
| 2011/0004885 | A1 | 1/2011 | Kikuchi et al. |
| 2011/0103455 | A1* | 5/2011 | Forrester et al. ............ 375/232 |
| 2011/0122005 | A1 | 5/2011 | Hekstra et al. |
| 2011/0304392 | A1 | 12/2011 | Zanchi |
| 2011/0314074 | A1 | 12/2011 | Batruni |
| 2012/0027418 | A1* | 2/2012 | Secondini et al. ............ 398/158 |
| 2012/0120990 | A1 | 5/2012 | Koren et al. |
| 2012/0154038 | A1 | 6/2012 | Kim et al. |
| 2012/0176191 | A1 | 7/2012 | Kim et al. |

OTHER PUBLICATIONS

Borremans, et al.; "A 40 nm CMOS 0.4-6 GHz Receiver Resilient to Out-of-Band Blockers;" IEEE Journal of Solid-State Circuits; vol. 46, No. 7; Jul. 2011; pp. 1659-1671.
Darabi; "A Blocker Filtering Technique for SAW-Less Wireless Receivers;" IEEE Journal of Solid-State Circuits; vol. 42, No. 12; Dec. 2007; pp. 2766-2773.
Deng, et al.; "A SiGe PA With Dual Dynamic Bias Control and Memoryless Digital Predistortion for WCDMA Handset Applications;" IEEE Journal of Solid-State Circuits; vol. 41, No. 5; May 2006; pp. 1210-1221.
Herman, et al.; "Efficient Multidimensional Polynomial Filtering for Nonlinear Digital Predistortion;" HPEC Workshop 2008 Presentation; MIT Lincoln Laboratory; Sep. 23, 2008; 4 pages.
Herman, et al.; "Efficient Multidimensional Polynomial Filtering for Nonlinear Digital Predistortion;" Sep. 23, 2008; 2 pages.
Keehr, et al.; "Successive Regeneration and Adaptive Cancellation of Higher Order Intermodulation Productions in RF Receivers;" IEEE Transactions on Microwave Theory and Techniques; vol. 59, No. 5; May 2001; pp. 1379-1396.
Kim, et al.; "An Active Filter Achieving 43.6dBm OIP3;" Radio Frequency Integrated Circuits Symposium (RFIC); IEEE; Jun. 5-7, 2011; pp. 1-4.
Kim; "Highly Linear Wireless Receiver;" Presentation at Idea Stream Symposium; Lincoln Laboratory, Massachusetts Institute of Technology; May 4, 2012; 12 pages.
Morgan, et al.; "A Generalized Memory Polynomial Model for Digital Predistortion of RF Power Amplifiers;" IEEE Transactions on Signal Processing; vol. 54, No. 10; Oct. 2006; pp. 3852-3860.
Song, et al.; "Nonlinear Equalization Processor IC for Wideband Receivers and Sensors;" HPEC 2009 Presentation; Sep. 23, 2009; 26 pages.
Song, et al.; "Nonlinear Equalization Processor IC for Wideband Receivers and Sensors;" Sep. 23, 2009; 2 pages.
Tropp, et al.; "Signal Recovery From Random Measurements via Orthogonal Matching Pursuit;" IEEE Transactions on Information Theory; vol. 53, No. 12; Dec. 2007; pp. 4655-4666.
Walden, "Analog-to-Digital Converter Survey and Analysis;" IEEE Journal on Selected Areas in Communication; vol. 17.; No. 4; Apr. 1999; pp. 539-550.
Application of Kim, et al.; U.S. Appl. No. 13/558,651, filed Jul. 26, 2012.
Office Action dated Nov. 6, 2013 for U.S. Appl. No. 13/558,651.
Kekatos, et al.; "Sparse Volterra and Polynomial Regression Models: Recoverability and Estimation;" IEEE Transactions on Signal Processing; vol. 59; No. 12; Dec. 2011; pp. 5907-5920.
Nazer, et al.; "Sparse Interactions: Identifying High-Dimensional Multilinear Systems via Compressed Sensing;" Communication, Control, and Computing (Allerton), 2010 48th Annual Allerton Conference on Sep. 29, 2010-Oct. 1, 2010; pp. 1589-1596.
International Search Report of the ISA for PCT/US2013/029069 dated May 9, 2013.
Written Opinion of the ISA for PCT/US2013/029069 dated May 9, 2013.
Office Action dated Apr. 2, 2014 from U.S. Appl. No. 13/558,651, filed Jul. 26, 2012.
Response to Office Action dated Nov. 6, 2013 as filed on Mar. 3, 2013.
Office Action dated Jul. 17, 2014 for U.S. Appl. No. 13/950,706, filed Sep. 25, 2013.
Response to Jul. 17, 2014 Office Action as filed on Oct. 15, 2015 for U.S. Appl. No. 13/950,706, filed Sep. 25, 2013.
Baschirotto, et al.; "Advances on Analog Filters for Telecommunications:" IEEE; Design, Automation and Test in Europe, 2008; Mar. 10-14, 2008; pp. 131-168.
Behbahani, et al.; "A Broad-Band Tunable CMOS Channel-Select Filter for a Low-IF Wireless Receiver," IEEE Journal of Solid-State Circuits; vol. 35; No. 4; Apr. 2000; pp. 476-489.
D'Amico, et al.; "A CMOS 5 nV/√Hz 74-dB-Gain-Range 82-dB-DR Multistandard Baseband Chain for Bluetooth, UMTS, and WLAN;" IEEE Journal of Solid-State Circuits; vol. 43; No. 7; Jul. 2008; pp. 1534-1541.
Iizuka, et al.; "A 14-bit Digitally Self-Calibrated Pipelined ADC With Adaptive Bias Optimization for Arbitrary Speeds Up to 40 MS/s;" IEEE Journal of Solid-State Circuits; vol. 41; No. 4; Apr. 2006; pp. 883-890.
Goodman, et al; "Polyphase Nonlinear Equalization of Time-Interleaved Analog-to-Digital Converters;" IEEE Journal of Selected Topics in Signal Processing; vol. 3; No. 3; Jun. 2009; pp. 362-373.
Quinn; "A Cascode Amplifier Nonlinearity Correction Technique;" Session XIV: Analog Techniques; IEEE International Solid-State Circuits Conference; Feb. 19, 1981; 3 pages.
Taherzadeh-Sani, et al.; "Power Optimization of Pipelined ADCs with High-Order Digital Gain Calibration;" Electronics, Circuits and Systems, 2007; ICECS; 14th IEEE International Conference on Dec. 11-14, 2007; pp. 661-664.
Yoshizawa, et al.; "Anti-Blocker Design Techniques for MOSFET-C Filters for Direct Conversion Receivers;" IEEE Journal of Solid-State Circuits; vol. 37; No. 3; Mar. 2002; pp. 357-364.
International Search Report and Written Opinion of the ISA for PCT/US2011/067222 dated Apr. 20, 2012.
International Preliminary Report on Patentability of the ISA for PCT/IS2011/067222; dated Jul. 18, 2013; 7 pages.
Image File Wrapper downloaded on Nov. 3, 2014 for U.S. Appl. No. 13/227,583, filed Sep. 8, 2011; 178 pages.
Image File Wrapper downloaded on Nov. 3, 2014 for U.S. Appl. No. 13/558,651, filed Jul. 26, 2012; Part 1 of 3; 400 pages.
Image File Wrapper downloaded on Nov. 3, 2014 for U.S. Appl. No. 13/558,651, filed Jul. 26, 2012; Part 2 of 3; 100 pages.
Image File Wrapper downloaded on Nov. 3, 2014 for U.S. Appl. No. 13/558,651, filed Jul. 26, 2012; Part 3 of 3; 117 pages.
Image File Wrapper downloaded on Nov. 3, 2014 for U.S. Appl. No. 13/950,706, filed Jul. 25, 2013; Part 1 of 7; 200 pages.
Image File Wrapper downloaded on Nov. 3, 2014 for U.S. Appl. No. 13/950,706, filed Jul. 25, 2013; Part 2 of 7; 200 pages.
Image File Wrapper downloaded on Nov. 3, 2014 for U.S. Appl. No. 13/950,706, filed Jul. 25, 2013; Part 3 of 7; 200 pages.
Image File Wrapper downloaded on Nov. 3, 2014 for U.S. Appl. No. 13/950,706, filed Jul. 25, 2013; Part 4 of 7; 200 pages.
Image File Wrapper downloaded on Nov. 3, 2014 for U.S. Appl. No. 13/950,706, filed Jul. 25, 2013; Part 5 of 7; 200 pages.
Image File Wrapper downloaded on Nov. 3, 2014 for U.S. Appl. No. 13/950,706, filed Jul. 25, 2013; Part 6 of 7; 200 pages.
Image File Wrapper downloaded on Nov. 3, 2014 for U.S. Appl. No. 13/950,706, filed Jul. 25, 2013; Part 7 of 7; 168 pages.

* cited by examiner

METHOD AND APPARATUS FOR SPARSE POLYNOMIAL EQUALIZATION OF RF RECEIVER CHAINS

CROSS REFERENCE TO RELATED APPLICATION

This application claims the benefit of U.S. Provisional Application No. 61/675,956 filed Jul. 26, 2012 under 35 U.S.C. §119(e) which application is hereby incorporated herein by reference in its entirety.

GOVERNMENT RIGHTS

This invention was made with government support under Contract No. FA8721-05-C-0002 awarded by the US Air Force. The government has certain rights in this invention.

FIELD

Subject matter disclosed herein relates generally to radio frequency (RF) systems and, more particularly, to RF receivers.

BACKGROUND

As is known in the art, a radio frequency (RF) receiver is an electronic device that receives RF signals (typically through an antenna) and converts the information carried by the RF signals to a usable form. As is also known, in some systems, RF receivers are complex electronic systems that are required to meet strict performance specifications. One performance parameter that is sometimes difficult to achieve in an RF receiver is linearity. In general, nonlinear operation within an RF receiver can result in the generation of nonlinear distortion components (e.g., harmonics and inter-modulation products, etc.) in an output signal of the receiver.

When both strong and weak signals are presented to a receiver input, nonlinear artifacts can be generated by the strong signals that can interfere with and/or possibly mask the weak signals at the receiver output. Techniques are therefore needed for reducing or eliminating nonlinear artifacts in a receiver output signal. It is generally desirable that the suppression of nonlinear artifacts be performed in a low power manner.

SUMMARY

Described herein are techniques and systems that may be used to improve linearity within radio frequency (RF) receiver systems. In some embodiments, techniques and systems for identifying and suppressing nonlinear artifacts generated within an analog portion of an RF receiver are provided. In addition, in some implementations, the suppression of nonlinear artifacts may be achieved using relatively little power.

In some embodiments, techniques for implementing a digital equalizer using sparse polynomial coefficients are provided to compensate for nonlinear distortion effects in an output signal of an RF receiver. As will be described in greater detail, a sparse polynomial equalizer is capable of achieving linear operation in a very power efficient manner. Calibration techniques are also provided for use in training a sparse polynomial equalizer for use with a particular RF receiver design.

The techniques and systems described herein may be used to reduce or eliminate nonlinear artifacts generated within an RF receive chain by replicating nonlinear distortions in an output signal of the receiver and subtracting these from the signal. In some embodiments, digital equalization circuitry is provided for implementing an arbitrary, sparse set of coefficients selected from all or part of a Volterra series. Techniques and structures are also provided for identifying Volterra series coefficients for use in the digital equalizer. As will be appreciated, substantial power and area savings can be achieved by using only a sparse subset of all possible coefficients. In addition, because of the sparseness of the coefficients used, the process for selecting nonzero coefficients for the equalizer from a larger set of coefficients can rely on fewer calibration signals than other nonlinear equalization techniques.

In some embodiments, a calibration procedure may involve the application of a series of multi-tone test signals to the analog circuitry of the RF receive chain while recording digitized output of the chain. When a multi-tone test signal is applied to the analog receiver chain, the receiver output will typically include nonlinear distortion components in addition to the amplified input signal. These nonlinear distortion components can be predicted given the polynomial order p and the input frequencies. To suppress these spurious tones, the calibration procedure may: (1) identify one or more subsets of Volterra series terms to use, and (2) calculate the appropriate coefficients. In this manner, the nonlinear products of the strong (desired) output tones may be used to recreate spurious inter-modulation and harmonic tones. The spurs can then be subtracted within the digital circuitry.

Using techniques described herein, in many cases, a relatively small number of calibration test signals may be used, each including a relatively small number of tones (e.g., one or two tones per signal in many implementations). This is in contrast to some previous nonlinear artifact mitigation techniques that utilize much more complex calibration signals, such as pseudorandom, or noise-like, sequences. In some embodiments, the number of calibration signals used may be proportional to the number of Volterra series terms used in the digital circuitry. In general, this may be proportional to the bandwidth of the receiver, but can be heavily circuit dependent.

As described above, in some implementations, a sparse subset of Volterra terms is generated in the digital domain using a streamlined calibration procedure. This is an improvement over prior techniques that use alternate analog paths to recreate sets of polynomial products in the analog domain (see, e.g., "Successive Regeneration and Adaptive Cancellation of Higher Order Intermodulation Products in RF Receivers," by E. A. Keehr, IEEE Trans. on Microwave Theory and Techniques, vol. 59, no. 5, pp. 1379-1396, May 2011). For example, the analog approach suffers from matching and linearity requirements in the alternative paths which are avoided in a digital implementation. In addition, in the techniques described herein, the calibration is performed prior to receiver operation. In contrast, some prior techniques use adaptive procedures that continuously adapt coefficients during receiver operation. In many cases, these prior techniques are not sufficient for achieving high linearity due to their tendency to let coefficients fluctuate around optimal settings.

In accordance with a first aspect of the concepts, systems, circuits, and techniques described herein, a receiver comprises: an analog receiver chain to process a signal received from a wireless channel, the analog receiver chain to generate an analog output signal; an analog-to-digital converter (ADC) to convert the analog output signal to a digital representation; and a digital equalizer to process the digital representation of the analog output signal to reduce nonlinear distortion components therein, wherein the digital equalizer is configured with a sparse set of non-zero Volterra series coefficients.

In accordance with another aspect of the concepts, systems, circuits, and techniques described herein, a method comprises: receiving a radio frequency (RF) signal from a wireless channel; processing the RF signal in an analog receiver chain to generate an analog baseband output signal; digitizing the analog baseband signal; and processing the digitized analog baseband signal in an equalizer using a sparse set of non-zero Volterra series coefficients.

In accordance with still another aspect of the concepts, systems, circuits, and techniques described herein, a calibration method for use in calibrating a digital equalizer for use with an analog receiver chain, comprises: applying a series of multi-tone test signals to an input of the analog receiver chain; recording digitized output signals of the analog receiver chain that correspond to the series of multi-tone signals; and selecting a sparse set of non-zero Volterra series coefficients for use in the digital equalizer based on the recorded digitized output signals.

In accordance with a further aspect of the concepts, systems, circuits, and techniques described herein, a receiver comprises: an analog receiver chain to process a signal received from a wireless channel, the analog receiver chain to generate an analog output signal; an analog-to-digital converter (ADC) to convert the analog output signal to a digital output signal; and a digital equalizer to process the digital output signal to reduce nonlinear distortion components therein, wherein the digital equalizer comprises: a delay unit to delay the digital output signal; a global exponentiation unit to generate multiple different powers of the digital output signal; a plurality of processing elements to process the digital output signal and the multiple different powers of the digital output signal using a sparse set of non-zero Volterra series coefficients; and an accumulator to generate a sum of the delayed digital output signal and the processed signals received from the plurality of processing elements.

DETAILED DESCRIPTION

Before describing a method and apparatus for sparse polynomial equalization of radio frequency (RF) receive chains, some introductory concepts and terminology are explained.

Reference is sometimes made herein to specific applications or to digital equalizers having a specific number of processing elements (PE's) or digital circuit components (including, but not limited to PE's) which operate on digital signals having a specific number of bits (e.g., 2, 8, 14, or 16 bits). It should be appreciated that reference to such specifics are made only to promote clarity in the written description and drawings and that such references are not intended as, and should not be construed as, limiting the scope of the broad concepts described herein. Rather, the systems and processes described herein related to sparse polynomial equalization of radio frequency (RF) receive chains can be utilized with digital signals having any number of bits or digital circuit components which process digital signals having a wide variety of different numbers of bits. The number of bits to use in any particular application may be selected in accordance with a variety of factors including but not limited to factors related to the needs of the particular application, the particular circuit components involved, as well cost and energy considerations.

The systems and techniques described herein allow one to provide a receiver having a linearity characteristic that is as good as, or at least comparable to, a conventional receiver while using far fewer processing elements than a conventional receiver. Since the number of processing elements is related to the operational cost of a receiver (e.g., power consumption, etc.), a receiver provided in accordance with the concepts described herein can have comparable linearity performance to a conventional receiver while at the same time using much less power than a conventional receiver. It should be appreciated that in some applications, power considerations are a dominant portion of the operational cost of a receiver. Thus, the systems and techniques described herein can result in large operational cost benefits (e.g., less power consumption).

Figure 1:
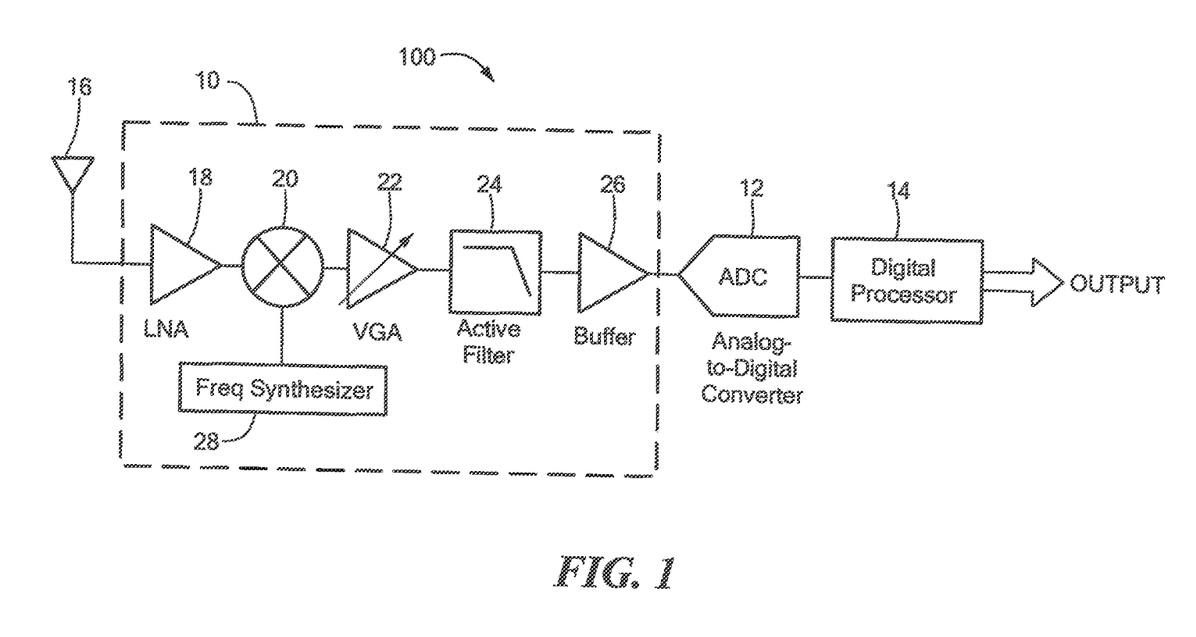
FIG. 1 is a block diagram illustrating an exemplary receiver system in accordance with an embodiment.

FIG. 1 is a block diagram illustrating an exemplary receiver system 100 in accordance with an embodiment. In some implementations, receiver system 100 may be adapted to receive both continuous wave (CW) and pulsed signals. As illustrated, receiver system 100 may include an analog receiver chain 10, an analog-to-digital converter (ADC) 12, and a digital processor 14. One or more antennas 16 (or other transducer(s)) may be provided to receive an RF signal from a wireless channel and deliver the signal to an input of the analog receiver chain 10. The analog receiver chain 10 may then process the RF signal to amplify the signal and convert it to a baseband format. The output signal of analog receiver chain 10 is then delivered to ADC 12 which digitizes the signal to support digital processing in digital processor 14. Digital processor 14 may include, among other things, digital spurious reduction circuitry (e.g., a digital equalizer, etc.) that is capable of reducing or eliminating one or more nonlinear distortion components within the output signal of analog receiver chain 10.

In the illustrated embodiment, the analog receiver chain 10 includes: a low noise amplifier (LNA) 18, a mixer 20, a variable gain amplifier (VGA) 22, an active filter 24, a buffer amplifier 26, and a frequency synthesizer 28. The analog receiver chain 10 is an example of a direct conversion receiver that includes a single frequency conversion stage that down-converts a received RF signal directly to base band. The LNA 18 is a high gain amplifier having a low noise figure that is operative for providing initial amplification of the received signal. Mixer 20 then down converts the amplified receive signal to baseband. Frequency synthesizer 28 generates a local oscillator (LO) signal for mixer 20 to support the down conversion. VGA 22 amplifies the baseband signal output by mixer 20 by a controllable gain amount. Active filter 24 may include, for example, a low pass filter for filtering the amplified baseband signal before it reaches buffer amplifier 26. Buffer amplifier 26 then provides a final analog amplification stage for the baseband signal before it is output to ADC 12.

With reference to FIG. 1, one or more of the components of analog receiver chain 10 may exhibit nonlinear performance characteristics. These nonlinear performance characteristics may cause one or more undesired nonlinear distortion components (e.g., harmonics and/or inter-modulation products) to appear in the output signal of analog receiver chain 10. These nonlinear distortion components can, among other things, mask lower level desired signal components in the receiver output signal and reduce the overall dynamic range of the receiver. Therefore, it is desirable to reduce or eliminate these components.

In various embodiments described herein, techniques are provided for reducing or eliminating the nonlinear distortion components within the output signal of an analog receiver chain digitally. In addition, techniques are provided that are capable of reducing such distortion components using relatively little power. As will be described in greater detail, this may be accomplished by employing a digital equalizer using sparse polynomial coefficients. As used herein, the phrase "sparse coefficients" and similar terms may refer to a small number of available coefficients. Low complexity techniques for calibrating an equalizer using sparse coefficients are also provided. In some embodiments, sparse polynomial equalization is used when it is determined that significant power savings in the receiver hardware can be achieved.

In some implementations, constraints or conditions may be placed on one or more operational parameters of an analog receiver chain (e.g., analog receive chain 10) to reduce, for example, memory effects in the receiver and/or to limit generation of nonlinear distortion components. In some cases, this may be needed to allow a sparse polynomial equalizer to be effective. Digital calibration may then be undertaken under the imposed constraints. For example, in some implementations, the bias levels of one or more amplifiers within an analog receiver chain may set so that the amplifier does not exceed the 1 dB compression point (i.e., does not enter saturation), even in the presence of the largest anticipated interferers. Other operational constraints may alternatively be used.

It should be appreciated that analog receiver chain 10 of FIG. 1 represents one possible analog receiver architecture that may be used in a receiver system in an example implementation. The equalization and calibration techniques described herein may be used with a wide variety of different analog receiver configurations and architectures, including much more complex architectures than that illustrated in FIG. 1. The particular receiver architecture that is used in an implementation will typically depend, at least in part, on the particular system and/or sub-block requirements of the receiver.

As described above, in some implementations, a digital equalizer may be used as part of a digital compensation architecture to reduce nonlinear distortion components in the output signal of an analog receiver chain. In RF systems having memory effects (e.g., RF receivers, etc.), a general nonlinear finite impulse response (FIR) model that may be used to model nonlinear operation is the Volterra series, which may be expressed as:

$$y_{NL}(n) = \sum_{p=0}^{P} \sum_{m_1=0}^{M} \cdots \sum_{m_p=0}^{M} h_p(m_1, \ldots, m_p) \prod_{l=1}^{p} x(n-m_l).$$

where P is the polynomial order, M is the memory depth, $h_p$ are the Volterra coefficients, x is the input, and $y_{NL}$ is the output. This model generalizes the linear FIR filter to polynomial combinations of the input. While this representation captures general nonlinear behavior, its complexity is combinatorial in memory depth (M). To enable use within real-time systems, some simplification of this model may be needed. In one possible simplification approach, a full coefficient space of the model may be divided into subspaces, and only a few of the subspaces may be selected for use in the equalizer. In addition, to achieve power savings, an equalizer may be designed that operates over only a portion of the coefficient space of the Volterra kernel, rather than the entire space.

When designing a digital compensation architecture, a digital equalizer circuit may be designed that uses coefficients of a generalized memory polynomial (GMP) architecture or similar architecture. One such architecture is described in "A Generalized Memory Polynomial Model for Digital Predistortion of RF Power Amplifiers" by Morgan et al., *IEEE Trans. Signal Process.*, Vol. 54, No. 10, 2006. In this model, the nonlinear output (neglecting the constant $h_0$ and linear $h_1$ terms) may be given by:

$$y(n) = \sum_{p=2}^{P} \sum_{m_1=0}^{M_1} \sum_{m_2=0}^{M_2} h_p(m_1, m_2) x(n-m_1) x^{p-1}(n-m_1-m_2)$$

This model is restricted to the coefficients lying on a 2-dimensional plane within the larger coefficient space. The model limits flexibility in that coefficients may no longer be chosen from arbitrary portions of the space, but it provides a simple, power-efficient implementation. Other techniques for selecting one or more subspaces of a full Volterra coefficient space may alternatively be used (e.g., memory polynomials (MP), etc.).

From the set of possible GMP coefficients, a small number of non-zero coefficients may be selected (e.g., up to five in one implementation) using a sparse signal estimation procedure. In one implementation, a procedure is used that is a modified version of the orthogonal matching pursuit (OMP) algorithm described in "Signal Recovery From Random Measurements via Orthogonal Matching Pursuit," by Tropp et. al, *IEEE Trans. Inform. Theory*, Vol. 53, No. 12, pp. 4655-4666, December 2007. It has been empirically observed that allowing the procedure to choose individual coefficients permits a greater initial dynamic range improvement to be achieved with fewer coefficients in a manner that is sufficient to compensate for nonlinearity in many analog receiver designs. It should be appreciated that sparse solvers other than OMP (e.g., compressive sampling matched pursuit (CoSaMP), approximate message passing (AMP), iterative thresholding, and/or others) may be used to select the sparse set of coefficients in other embodiments.

Figure 2:
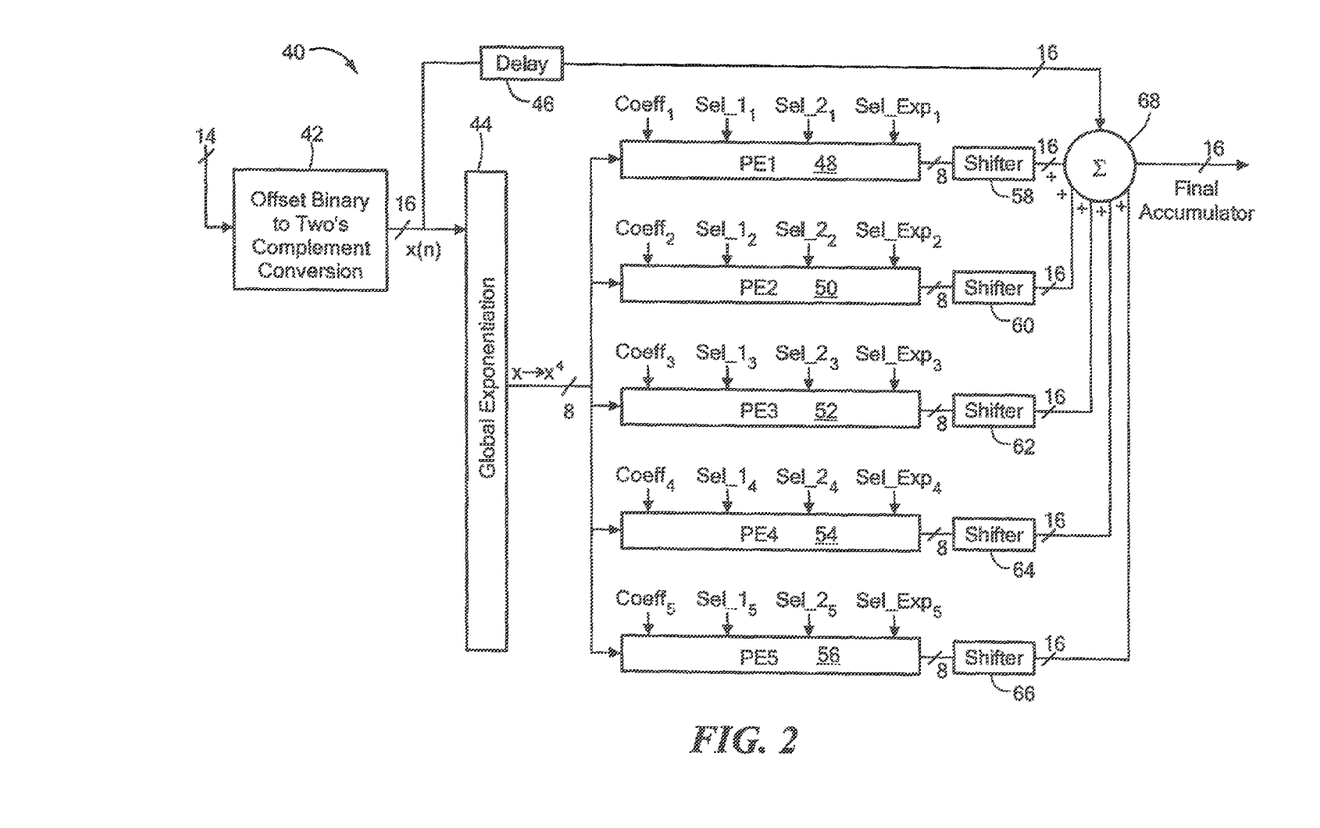
FIG. 2 is a block diagram illustrating a digital equalizer circuit that may be used to provide nonlinearity compensation for an analog receiver chain in accordance with an embodiment.

FIG. 2 is a block diagram illustrating a digital equalizer circuit 40 that may be used to provide nonlinearity compensation for an analog receiver design (or other circuit designs) in accordance with an embodiment. Digital equalizer circuit 40 may be used within, for example, receiver system 100 of FIG. 1 or in other receiver systems. In some embodiments, digital equalizer circuit 40 may be configured to select and use a small number of non-zero GMP coefficients using a sparse signal estimation procedure, as described above. As illustrated, digital equalizer circuit 40 comprises: a two's complement converter 42; a global exponentiation unit 44; a delay unit 46; a plurality of processing elements (PEs) 48, 50, 52, 54, 56; a plurality of digital shifters 58, 60, 62, 64, 66 corresponding to the plurality of processor elements; and an output accumulator 68. As described previously, a signal output by an analog receiver chain may first be converted to a digital format within an analog to digital converter (ADC) before being input into digital equalizer circuit 40. Two's complement converter 42 is operative for converting the input data to a two's complement format, if needed. The output of two's complement converter 42 will be denoted as x(n) herein and, in at least one embodiment, is a 16-bit signal.

Global exponentiation unit 44 is operative for raising signal x(n) to powers ranging from 2 to 4 to provide polynomial combinations of the signal for processing (e.g., x(n) to $x^4(n)$). The use of centralized exponentiation eliminates the need to provide individual exponentiation circuitry within each processing element 48, 50, 52, 54, 56, resulting in significant power savings within equalizer 40. To save additional power, signal x(n) may be truncated to a particular number of most significant bits (MSBs) (e.g., 8 bits, etc.) before being applied to global exponentiation unit 44, in some embodiments. As will be described in greater detail, PEs 48, 50, 52, 54, 56 process the polynomial combinations output by global exponentiation unit 44 in a predetermined manner to each generate an 8-bit output signal. The 8-bit output of each PE 48, 50, 52, 54, 56 is then sign-extended and shifted (multiplied) in a corresponding shifter 58, 60, 62, 64, 66 to generate a 16-bit shifted output signal. The shifted outputs are then summed together with a delayed version of the uncompensated 16-bit signal x(n) in accumulator 68. The delayed version of x(n) is received from delay unit 46. The accumulator 68 is where the actual subtraction of nonlinear effects from x(n) is taking place. The subtraction is achieved by the use of negating coefficients.

In general, one PE will be needed within digital equalizer circuit 40 for each of the coefficients within a sparse set of coefficients. In some implementations, the number of PE's that are provided in a digital equalizer may represent a maximum number of coefficients that may be needed in a corresponding system. During operation, however, fewer than all PE's may be activated in a particular implementation.

Shifting the output signals of the PEs 48, 50, 52, 54, 56 allows a greater range of coefficients to be used by the PEs 48, 50, 52, 54, 56 for more accurate compensation. In the illustrated implementation, for example, the input signal to digital equalizer circuit 40 is 14 bits, and the shifters 58, 60, 62, 64, 66 extend this up to 16 bits to allow for larger dynamic range compensation.

Figure 3:
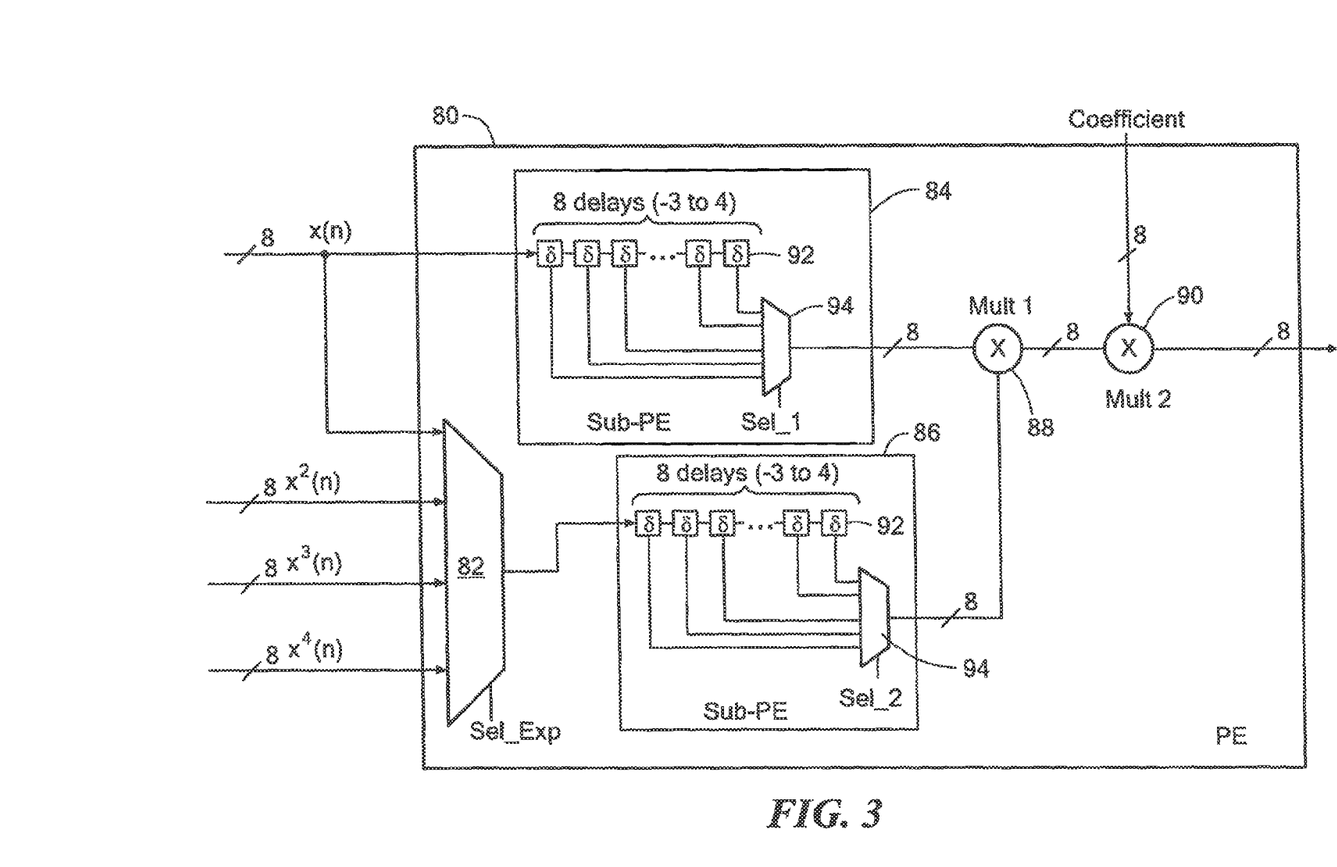
FIG. 3 is a block diagram illustrating an example processing element for use in a digital equalizer in accordance with an embodiment.

FIG. 3 is a block diagram of an example processing element 80 in accordance with an embodiment. Processing element 80 may be used within, for example, digital equalizer circuit 40 of FIG. 2 and/or other equalization circuits. As illustrated, processing element 80 includes: a multiplexer 82, first and second adjustable delay blocks (or sub-processing elements) 84, 86, and first and second multipliers 88, 90. Delay blocks 84, 86 are each operative for delaying an input signal by a desired amount. First delay block 84 delays the truncated (8-bit) version of input signal x(n) by a first delay amount. Second delay block 86 delays a truncated version of either the input signal x(n) or the second, third, or fourth powers of x(n) by a second delay amount. Multiplexer 82 is operative for selecting the signal that will be processed by second delay block 86 (i.e., x(n), $x^2(n)$, $x^3(n)$, or $x^4(n)$). As illustrated, multiplexer 82 may include a select input (i.e., Sel_Exp) for use in selecting the input signal to be processed.

The delayed output signals of first and second delay blocks 84, 86 are multiplied together in first multiplier 88 to form a first product. To conserve power, the first product may be truncated to a particular number of MSBs (e.g., 8-bits, etc.) in some embodiments. The first product may then be multiplied by a predetermined coefficient in second multiplier 90 to form a second product, which serves as the output signal of processing element 80.

In at least one implementation, each of the delay blocks 84, 86 may include a series of delay elements 92 and a multiplexer 94. The delay elements 92 may each have an output that is coupled to an input of multiplexer 94. A signal to be delayed is applied to an input of the series of delay elements 92 and allowed to propagate through the elements. Multiplexer 94 is then able to select an output signal of one of the delay elements 92 that has a desired delay amount for passage to an output. Each multiplexer 94 may have an input (e.g., Sel_1, Sel_2, etc.) for use in setting the delay value of the corresponding delay block 84, 86. Other types of delay blocks may be used in other implementations.

The signal selected by multiplexer 82, the delay values used in first and second delay blocks 84, 86, and the coefficient used by second multiplier 90 may each be determined during a training/calibration operation to achieve a desired equalizer response for a corresponding equalizer (e.g., digital equalizer circuit 40 of FIG. 2). After training, control signals may be sent to the corresponding components of processing element 80 to configure the element. In general, each processing element in an equalizer may be independently configured to achieve the desired equalizer response.

It should be appreciated that digital equalizer circuit 40 of FIG. 2 and processing element 80 of FIG. 3 are merely examples of different circuits that may be used to perform digital compensation in various embodiments. Many alternative compensation architectures may be used.

As described above, in some implementations, a calibration process may be undertaken to determine the sparse set of coefficients to be used by a digital equalizer for a particular receiver. For example, in one possible implementation, a total of five Volterra series terms described by $h_p(m_1, \ldots, m_p) \times (n-m_1) \ldots (n-m_p)$ may be used, but these five terms could be any terms with p=2, 3 and m=0, 1, 2, ..., 4. In this example, the digital equalizer may implement five out of a possible 150 terms. Because only a sparse subset of all possible terms of the Volterra series are needed, the calibration procedure must identify this sparse subset (i.e., the specific values of p and $m_i$ to use) in addition to estimating the coefficients $h_p(m_1, \ldots, m_p)$.

Figure 4:
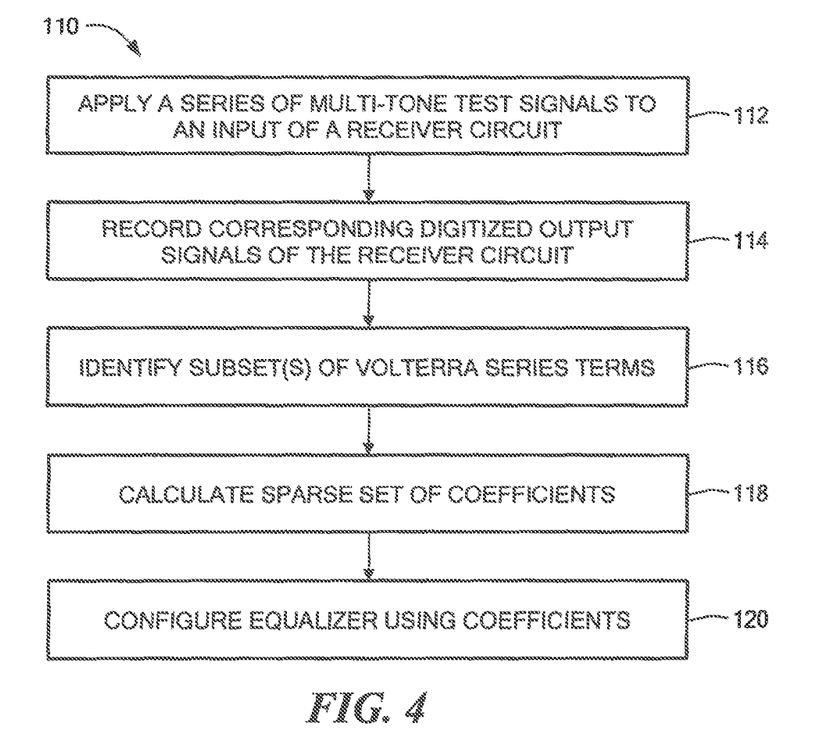
FIG. 4 is a flow diagram illustrating an example process for calibrating a digital equalizer in accordance with an embodiment.

FIG. 4 is a flow diagram illustrating an example process for calibrating a digital equalizer in accordance with an embodiment.

The rectangular elements (typified by element 112 in FIG. 4) are herein denoted "processing blocks" and may represent computer software instructions or groups of instructions. It should be noted that the flow diagram of FIG. 4 represents one exemplary embodiment of the design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 4 can be performed in any convenient or desirable order.

Referring to FIG. 4, a method 110 for calibrating a digital equalizer will now be described. This calibration process will typically be performed prior to operation of the receiver system. A series of multi-tone test signals may first be applied to an input of an analog receiver chain (block 112). Corresponding digitized output signals of the analog receiver chain may then be recorded (block 114). The digitized output signals may be output by an ADC coupled to an output of the analog receiver chain (e.g., ADC 12 in FIG. 1). One or more subsets of Volterra series terms may optionally be identified (block 116). For example, specific values of p and $m_i$ may be identified in some implementations. Coefficients may then be calculated based on the identified Volterra series subset and the (block 118). The digital equalizer may then be configured using the coefficients (block 120).

Because of the sparseness of the coefficients used, fewer test signals are needed during calibration than are required for other nonlinear equalization techniques. That is, the number of test signals needed may be roughly proportional to the number of Volterra series terms used in the digital equalizer. In general, this may be proportional to the bandwidth of the receiver, but can be heavily circuit dependent.

The multi-tone test signals may each include two or more tones. In one possible approach, the test signals may be generated using frequency tone generators (e.g., signal generators, frequency synthesizers, etc.) and power combiners. Filters may also be used if the nonlinear content in the output signals of the tone generators is too high. The multi-tone test signals will typically differ from one another in the frequency and spacing of the tones. In some implementations, the test signals may include one or more single tone signals in addition to the multi-tone signals.

The subset(s) of Volterra series terms may be selected based on, for example, previous knowledge of a circuit's nonlinear behavior, availability of a low power hardware implementation, trial and error, and/or other techniques, including combinations of the above. In some implementations, a subset of Volterra series terms is not selected. That is, the sparse set of Volterra coefficients may be selected directly from the full Volterra coefficient space. Given an initial subset of Volterra coefficients, a matrix whose columns represent all possible input combinations (i.e., all possible delay and polynomial order combinations) may be constructed. OMP, or a similar sparse estimation procedure, can then be used to select the sparse set of coefficients. In different implementations, the number of coefficients within the sparse set of coefficients may vary based on a number of different factors including, for example, the bandwidth of the underlying circuitry, the architecture of the analog receiver chain, whether analog nonlinearity compensation techniques are implemented within the analog receiver chain, and/or other factors. In some embodiments, the sparse set of non-zero Volterra series coefficients may include 20 or less coefficients. In other implementations, the sparse set of non-zero Volterra series coefficients may include 10 or less coefficients. In still other implementations, the sparse set of non-zero Volterra series coefficients includes 5 or less coefficients.

Figure 5:
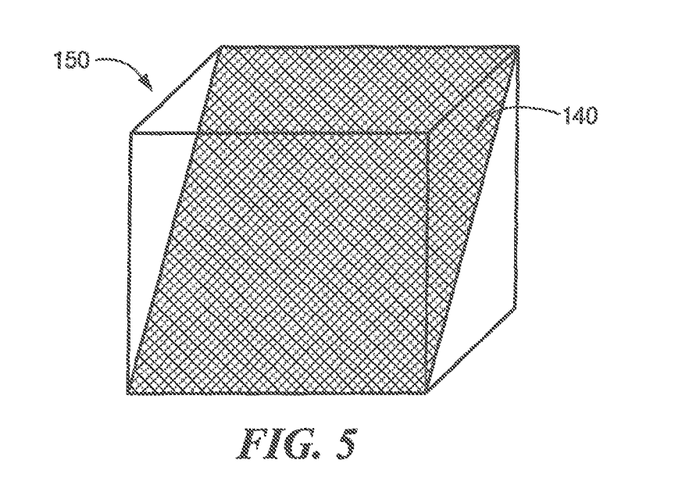
FIG. 5 is a diagram illustrating a subset of third order Volterra series terms from which coefficients may be selected in accordance with an embodiment.

FIG. 5 is a diagram illustrating a subset of third order Volterra series terms from which coefficients may be selected in accordance with an embodiment. As shown, a subset 140 of Volterra series terms may be identified from a much larger set 150 of possible terms. In the illustrated example, the subset of terms 140 lie in a 2-dimensional plane associated with the generalized memory polynomial (GMP) architecture. The subset 140 of FIG. 5 is for a third order Volterra kernel. Typically, coefficients from many different orders (e.g., second, third, fifth, etc.) will be included in an initial subset. As described above, in some implementations, a sparse set of coefficients is selected directly from a full Volterra coefficient space without first identifying subsets.

In the description above, techniques and structures are discussed for reducing or eliminating nonlinear distortion components in the output signal of an analog receiver chain. It should be appreciated that these techniques and structures may also be used to reduce or eliminate nonlinear distortion components for individual circuit elements (e.g., amplifiers, filters, mixers, etc.), or sub-groups of elements, within an analog receiver chain. In some implementations, the techniques and structures may be used to perform nonlinearity compensation for RF devices or components that are not associated with an RF receiver. The techniques and structures described herein may be utilized in connection with receivers that use discrete components and also in receivers that use integrated circuit techniques. In at least one embodiment, a receiver system is provided that is implemented as a System-on-Chip (SoC).

In the description above, novel techniques, systems, and concepts are described in the context of digital equalizers that utilize coefficients selected from a Volterra series. It should be understood that, in some embodiments, these techniques, systems, and concepts may be used in connection with digital processing structures (e.g., equalizers, filters, etc.) that utilize coefficients associated with other types of series (e.g., Taylor series, etc.).

Having described certain exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A receiver comprising:
an analog receiver chain to process a signal received from a wireless channel, the analog receiver chain to generate an analog output signal;
an analog-to-digital converter (ADC) to convert the analog output signal to a digital representation; and
a digital equalizer to process the digital representation of the analog output signal to reduce nonlinear distortion components therein, wherein the digital equalizer is configured with a sparse set of non-zero Volterra series coefficients, wherein the sparse set of coefficients is selected based on measured receiver output data resulting from known receiver input signals.

2. The receiver of claim 1, wherein:
the sparse set of non-zero Volterra series coefficients reflect nonlinear performance characteristics of the analog receiver chain and all coefficients in the sparse set occur within a two dimensional plane of the Volterra coefficient space.

3. The receiver of claim 1, wherein:
the sparse set of non-zero Volterra series coefficients used in the digital equalizer do not change with time.

4. The receiver of claim 1, wherein:
the sparse set of non-zero Volterra series coefficients includes 20 or fewer coefficients.

5. The receiver of claim 1, wherein:
the sparse set of non-zero Volterra series coefficients includes 10 or fewer coefficients.

6. The receiver of claim 1, wherein:
the sparse set of non-zero Volterra series coefficients includes 5 or fewer coefficients.

7. A method comprising:
receiving a radio frequency (RF) signal from a wireless channel;
processing the RF signal in an analog receiver chain to generate an analog baseband output signal;
digitizing the analog baseband signal; and
processing the digitized analog baseband signal in an equalizer using a sparse set of non-zero Volterra series coefficients to reduce nonlinear distortion components therein, wherein the sparse set of coefficients is selected based on measured receiver output data resulting from known receiver input signals.

8. The method of claim 7, wherein:
the sparse set of non-zero Volterra series coefficients reflects nonlinear performance characteristics of the analog receiver chain and all coefficients in the sparse set occur within a two dimensional plane of a Volterra coefficient space.

9. The method of claim 7, wherein:
the sparse set of non-zero Volterra series coefficients includes 20 or fewer coefficients.

10. The method of claim 7, wherein:
the sparse set of non-zero Volterra series coefficients includes 10 or fewer coefficients.

11. The method of claim 7, wherein:
the sparse set of non-zero Volterra series coefficients includes 5 or fewer coefficients.

12. A calibration method for use in calibrating a digital equalizer for use with an analog receiver chain, comprising:
applying a series of multi-tone test signals to an input of the analog receiver chain;
recording digitized output signals of the analog receiver chain that correspond to the series of multi-tone signals; and
selecting a sparse set of non-zero Volterra series coefficients for use in the digital equalizer based on the recorded digitized output signals.

13. The calibration method of claim 12, further comprising:
identifying one or more subsets of Volterra series terms based on the recorded digitized output signals before selecting the sparse set of non-zero Volterra series coefficients, wherein the sparse set of non-zero Volterra series coefficients are selected from the one or more subsets of Volterra series terms.

14. The calibration method of claim 13, wherein:
identifying one or more subsets of Volterra series terms includes identifying terms associated with a generalized memory polynomial (GMP) technique.

15. The calibration method of claim 12, further comprising:
calculating values for the sparse set of non-zero Volterra series coefficients based on the recorded digitized output signals.

16. The calibration method of claim 15, further comprising:
configuring the digital equalizer using the sparse set of non-zero Volterra series coefficient values.

17. The calibration method of claim 12, wherein:
the sparse set of non-zero Volterra series coefficients includes 20 or fewer coefficients.

18. The calibration method of claim 12, wherein:
the sparse set of non-zero Volterra series coefficients includes 10 or fewer coefficients.

19. The calibration method of claim 12, wherein:
the sparse set of non-zero Volterra series coefficients includes 5 or fewer coefficients.

20. A receiver comprising:
an analog receiver chain to process a signal received from a wireless channel, the analog receiver chain to generate an analog output signal;
an analog-to-digital converter (ADC) to convert the analog output signal to a digital output signal; and
a digital equalizer to process the digital output signal to reduce nonlinear distortion components therein, wherein the digital equalizer comprises:
a delay unit to delay the digital output signal;
a global exponentiation unit to generate multiple different powers of the digital output signal;
a plurality of processing elements to process the digital output signal and the multiple different powers of the digital output signal using a sparse set of non-zero Volterra series coefficients; and
an accumulator to generate a sum of the delayed digital output signal and the processed signals received from the plurality of processing elements;
wherein the plurality of processing elements includes a first processing element comprising: (a) a first delay unit to provide a first delay to the digital output signal; (b) a multiplexer to select one of: the digital output signal and multiple powers of the digital output signal generated by the global exponentiation unit; and (c) a second delay unit to provide a second delay to the signal selected by the multiplexer.

21. The receiver of claim 20, further comprising:
a binary to two's complement conversion unit to convert the digital output signal to a two's complement representation before it reaches the digital equalizer.

22. The receiver of claim 20, wherein:
the plurality of processing elements includes one processing element for each of the coefficients in the sparse set of non-zero Volterra series coefficients.

23. The receiver of claim 20, wherein multiple processing elements in the plurality of processing elements each comprise:
a first delay unit to provide a first delay to the digital output signal;
a multiplexer to select one of: the digital output signal and multiple powers of the digital output signal generated by the global exponentiation unit; and
a second delay unit to provide a second delay to the signal selected by the multiplexer.

24. The receiver of claim 20, wherein the first processing element further comprises:
a first multiplier to multiply a delayed signal output by the first delay unit and a delayed signal output by the second delay unit to generate a product signal; and
a second multiplier to multiply the product signal by a coefficient of the sparse set of non-zero Volterra series coefficients.

25. The receiver of claim 1, wherein:

the digital equalizer is configured to digitally recreate spurious inter-modulation and/or harmonic tones using strong tones in the digital representation of the analog output signal based on the sparse set of non-zero Volterra series coefficients and to subtract the recreated spurious tones from the digital representation of the analog output signal.

26. The method of claim 7, wherein processing the digitized analog baseband signal in the equalizer using the sparse set of non-zero Volterra series coefficients includes:

digitally recreating spurious inter-modulation and/or harmonic tones using strong tones in the digitized baseband signal using the sparse set of non-zero Volterra series coefficients; and subtracting the recreated spurious tones from the digitized baseband signal.

27. The calibration method of claim 12, wherein:

the test signals in the series of multi-tone test signals each include only a small number of individual tones and the frequency and/or separation of tones is different in different test signals.

28. The calibration method of claim 12, further comprising:

applying one or more single-tone test signals to the input of the analog receiver chain in addition to the multi-tone test signals, wherein recording digitized output signals of the analog receiver chain further comprises recording digitized output signals of the analog receiver chain that correspond to the single-tone test signals.

29. The calibration method of claim 12, wherein:

the series of multi-tone test signals includes a small number of test signals that is roughly proportional to a number of coefficients in the sparse set of non-zero Volterra series coefficients.

* * * * *